United States Patent [19]

Illy

[11] 4,353,293
[45] Oct. 12, 1982

[54] COFFEE MACHINE

[76] Inventor: Ernesto Illy, 8, Via Locchi, Trieste, Italy

[21] Appl. No.: 261,681

[22] Filed: May 7, 1981

[30] Foreign Application Priority Data

Jun. 10, 1980 [IT] Italy .............................. 22675 A/80

[51] Int. Cl.³ ............................................ A47J 31/24
[52] U.S. Cl. .................................. 99/283; 99/289 T; 99/299; 99/302 R
[58] Field of Search ................ 99/283, 289 R, 289 T, 99/299, 302 R, 295, 302 P, 280, 281, 282, 307, 289 P, 289 D, 300

[56] References Cited

U.S. PATENT DOCUMENTS

| | | | |
|---|---|---|---|
| 2,881,692 | 4/1959 | Volcov | 99/283 |
| 2,935,011 | 5/1960 | Perlman | 99/283 |
| 3,143,954 | 8/1964 | Nesmith | 99/302 |
| 3,423,209 | 1/1969 | Weber | 99/283 |
| 3,446,137 | 5/1969 | Pryor | 99/289 |
| 4,253,385 | 3/1981 | Ernesto | 99/281 |

Primary Examiner—Robert W. Jenkins
Attorney, Agent, or Firm—Karl H. Gross

[57] ABSTRACT

An espresso machine has a coffee brewing chamber, a water reservoir and a water heater. Two electrical pumps are provided, one capable of supplying a smaller quantity of water from the reservoir via the heater to the brewing chamber so as to make a regular-strength coffee beverage, and the other capable of supplying a considerably larger quantity of water from the reservoir via the heater to the brewing chamber, so as to make a weaker-strength coffee beverage from an identical quantity of coffee. A selector at the outside of the machine allows a user to select which one of the pumps he wishes to energize.

7 Claims, 1 Drawing Figure

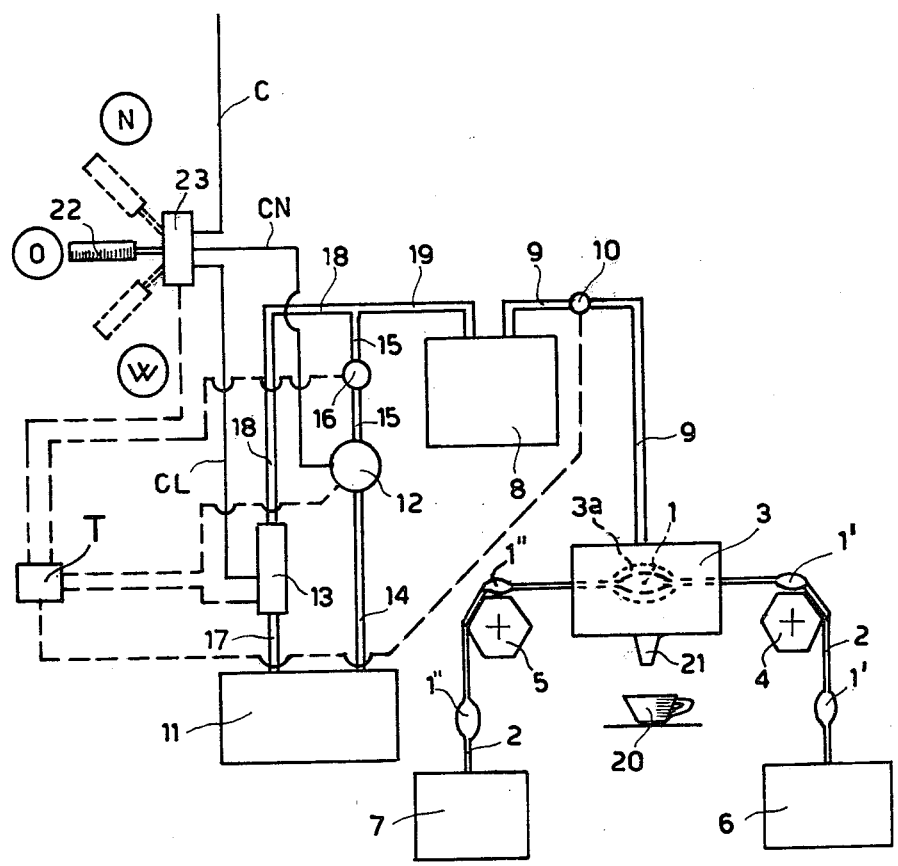

COFFEE MACHINE

BACKGROUND OF THE INVENTION

The present invention relates to a coffee machine in general, and to an electric coffee machine in particular.

Still more specifically, the invention relates to an espresso coffee machine for brewing coffee from coffee pods.

Coffee machines are already known which brew coffee from coffee pods by passing hot water through a coffee-containing pod located in a brewing or extraction chamber. Such machines are valued for the reliable reproducibility of their brewing results.

It is also known that there are coffee machines which supply cups of coffee of constant volume (and hence strength) and others which, on demand, supply cups of coffee of different volumes (and hence strengths) by varying the quantity of water which is made to pass through a coffee pod, or by using filters of different characteristics.

Let is be assumed, for purposes of the explanations hereafter, that the term "standard coffee" (i.e. coffee beverage of "standard" strength) refers to an espresso coffee beverage made by passing about 40 cc of hot water through a predetermined quantity of ground or powdered coffee beans in e.g. a pod. Let is further be assumed that the term "weak coffee" refers to an espresso coffee beverage made by passing a substantially higher quantity of hot water, about 120 cc, through an identical quantity of ground or powdered coffee beans. Of course, these quantities and the relationship between them are arbitrary and intended only to facilitate explanations.

The prior-art variable-volume coffee machines have several decided disadvantages. Chief among these are the fact that the beverage which results when the water volume is changed, will vary not only in quantity but also in taste and appearance (the creamy, foamy appearance of typical espresso), and also that brewing of a "weak" coffee requires a preparation time which is much longer (as much as 3-4 times longer) than the time required for preparation of the "standard" coffee.

SUMMARY OF THE INVENTION

It is an object of the present invention to overcome the disadvantages of the prior art.

More specifically, it is an important object of the invention disclosed herein to provide a novel coffee machine which assures that the preparation period is substantially the same, whether "standard" or "weak" coffee is being brewed.

Another, no less important object of the invention is to provide such a novel coffee machine which assures that the taste (although not the strength) of the coffee beverage and its creamy, foamy appearance, remain the same irrespective of whether a "standard" or a "weak" coffee is being brewed.

Pursuant to the above objects, and still others which will become apparent as the description proceeds, one aspect of the invention resides in a coffee machine which, briefly stated, may comprise means defining a brewing chamber having an outlet for brewed coffee and being adapted to receive pods of coffee; a water reservoir; means for heating water operatively connected with the brewing chamber; first pump means connected with the reservoir and heating means for forwarding, when energized, a first quantity of water from the reservoir to the heating means and a corresponding quantity of heated water from the heating means to the brewing chamber; second pump means also connected with the reservoir and heating means for forwarding, when energized, a second larger quantity of water from the reservoir to the heating means and a corresponding quantity of heated water from the heating means to the brewing chamber and control means for selectively energizing one of the first and second pump means.

It should be understood that as a result of experimentation made by the inventor the novel espresso coffee machine is provided with two different pumps, a rotary pump and a reciprocating pump, able to work alternatively for pumping conveniently heated water through a coffee pod; it was found that a convenient rotary pump delivering a standard coffee in a normally accepted time period may be associated in the machine with a certain convenient reciprocating pump that delivers a weak coffee in a time period not much longer than the rotary one, the latter coffee so having a taste and an appearance still equal to those of standard coffee.

The invention will hereafter be described with reference to an exemplary embodiment, as illustrated in the appended drawings. It is to be understood, however, that this is for purposes of explanation of the invention only, and is not to be considered as implying any limitations whatsoever.

BRIEF DESCRIPTION OF THE DRAWING

The single FIGURE is a diagrammatic illustration of a coffee machine embodying the invention.

DESCRIPTION OF PREFERRED EMBODIMENTS

The machine illustrated in the FIGURE brews each beverage to be dispensed, from a fresh coffee pod 1. Such pods are known from the prior art, for example from U.S. allowed application Ser. No. 033,815, now U.S. Pat. No. 4,253,385, and are essentially small quantities of powdered or granulated coffee bean material, which may be compressed and is contained in a water-permeable cover. In the present instance this cover is a tape 2 of filter cloth, filter paper or the like, in which the pods 1 are incorporated at identical intervals. A supply container 6 for fresh pods 1' and a container 7 for used pods 1" are provided. The tape is placed over polygonal drums 4, 5 which turn about axes normal to the plane of the FIGURE, so that the pods 1' are sequentially pulled out of the container 6, introduced (as pods 1) intro brewing chamber 3a of brewing element 3, and then deposited as used pods 1" in the container 7. In container 6 the tape may be stored by rolling up, zig-zag folding, or in any other manner. One or both of the drums 4, 5 may be driven; the drive itself is known per se.

A water reservoir 11 contains a supply of water and is connected with a water heater 8 via two conduit branches. One of these is composed of conduits 14, 15 and 19; the other of conduits 17, 18 and 19. Interposed in the conduits 14, 15 is a first pump 12 which is in form of a rotary pump, for example of the type commercially available under the tradename "Procon" from Standex International GmbH in Krefeld, Federal Republic of Germany. Interposed in the conduit 18 is a second pump 13 which is, however, a reciprocating pump, for example of the plunger type available commercially under the tradename "Turmix" from Turmix A. G. of Rapperswill-Jona, Switzerland. Each of the pumps 12, 13 is connected with and has its length of operation controlled by, a multi-cam timer T (known per se). A solenoid valve 16 is interposed in conduit 15 downstream of the pump 12. Conduit 19 is connected with the water heater 8; an outlet conduit 9, in which a solenoid valve 10 is interposed, connects the water heater 8 with the brewing chamber 3a. Water is heated in water heater 8 by a not-illustrated (known-per-se) electric resistance heating element; the internal temperature and pressure in the water heater 8 are controlled by a thermostat and valve (not shown), both known per se.

The brewing element 3 is provided with an outlet 21 for brewed coffee beverage originating in the brewing chamber 3a. A user places a cup or other receptacle 20 beneath this outlet 21 before operating the machine.

A lever 22 provided with a handle is mounted on a switch 23 so as to be accessible at the exterior of the machine. Lever 22 can be moved between a neutral position 0 in which the machine is shut off, a position N into which it is placed when "normal" coffee is to be brewed, and a position W into which it is placed when "weak" coffee is desired. When in position N, lever 22 closes an electrical circuit between a current-supply line C and the internal electric line which feeds the pump 12, thereby actuating the pump 12 through the multi-cam timer. In position W the lever 22 closes the circuit between the line C and line CL which feeds pump 13, thus actuating the latter pump.

In operation, and assuming that the machine is ready to work, that a fresh pod 1 is located in chamber 3a, and that a user desires to obtain "normal" coffee, the user places the lever into the position N. This causes solenoid valves 10 and 16 to open (their electrical connections for this purpose are also known per se and hence not shown) and the pump 12 to be energized. The pump 12 now pumps nearly 40 cc of water from reservoir 11 into the water heater 8; at the same time, an equal quantity of the already hot water contained therein is displaced out of the water heater 8 and forwarded via conduit 9 into the brewing chamber 3a. The working period of pump 12 is controlled by timer T which shuts the pump down when 40 cc (or nearly 40 cc) of water have been pumped and valves 10, 16 close. The hot water passes through pod 1 and brews "normal" strength coffee which runs off through outlet 21.

At the end of the cycle, when the pump 12 stops and the solenoid valves 10, 16 close again, the spring-loaded lever 22 returns to the neutral position 0, and the drums 4, 5 turn to transport the used pod 1" out of chamber 3a and a fresh pod 1' into the chamber.

By this time the new (cold) water pumped into the water heater 8 by pump 12 has already been heated to the correct temperature, since the heating element is so dimensioned as to require only seconds for this purpose. If, now, another user comes along who prefers "weak" coffee, he can move the lever 22 to the position W. The previous cycle is then repeated, but with the difference that the solenoid valve 16 remains closed and that it is the pump 13 which is energized, rather than the pump 12. Pump 13 pumps nearly 120 cc of water from reservoir 11 into heater 8, and displaces the same quantity of hot water from heater 8 via conduit 9 into the chamber 3a. Again, the working time of pump 13 is controlled by its associated timer.

The time required for passing the nearly 120 cc of hot water through the pod 1 in chamber 3a, to brew a "weak" coffee beverage, is about 4.5 seconds. This is only a few seconds longer than the time required to brew the "normal" beverage, so that the pronounced time differential in brewing the different-strength beverages is avoided. Moreover, the taste (but not the strength) of the weaker coffee, and its appearance, are the same as for the "normal" beverage, so that the machine according to the invention assures one and the same piece of equipment is capable of dispensing "normal" and "weak" coffee brews of the same taste and appearance and in essentially the same time periods.

The invention has been described with reference to a specific embodiment in an espresso machine. It will be understood, however, that it is not limited thereto and that various modifications are possible which are all intended to be encompassed within the scope of the appended claims.

I claim:

1. In a coffee machine, a combination comprising
   means defining a brewing chamber having an outlet for brewed coffee and being adapted to receive pods of coffee;
   a water reservoir;
   means for heating water operatively connected with said brewing chamber;
   first pump means connected with said reservoir and heating means for forwarding, when energized, a first quantity of water from said reservoir to said heating means and a corresponding quantity of heated water from said heating means to said brewing chamber;
   second pump means also connected with said reservoir and heating means for forwarding, when energized, a second larger quantity of water from said reservoir to said heating means and a corresponding quantity of heated water from said heating means to said brewing chamber; and
   control means for selectively energizing one of said first and second pump means.

2. A combination as defined in claim 1, one of said pump means comprising a rotary pump and the other of said pump means comprising a reciprocating pump.

3. A combination as defined in claim 2, said one pump means being said first pump means, and said reciprocating pump being operative for forwarding said second quantity of water in a period of time only insubstantially longer than the time period required by said rotary pump to forward said first quantity of water.

4. A combination as defined in claim 3, said reciprocating pump being dimensioned to forward a second quantity of water which is approximately triple said first quantity of water.

5. A combination as defined in claim 1; and further comprising conduit means connecting said reservoir and water heating means with said brewing chamber, said first and second pump means being interposed in said conduit means.

6. A combination as defined in claim 1; and further comprising timing means operatively connected with said first and second pump means for energizing the same until said first and second quantity of water are supplied to said brewing chamber, respectively.

7. A combination as defined in claim 1; said pump means comprising electric pumps; and further comprising user-operable activating means electrically connected with said pump means and accessible at the outside of said coffee machine for enabling a user to selectively energize one or the other of said first and second pump means.

* * * * *